(12) United States Patent
Fukushima

(10) Patent No.: US 10,798,290 B2
(45) Date of Patent: Oct. 6, 2020

(54) IMAGE CAPTURING APPARATUS FOR CONTROLLING WHETHER TO EXECUTE FUNCTION ASSIGNED TO OPERATION MEMBER, AND CONTROL METHOD THEREOF

(71) Applicant: CANON KABUSHIKI KAISHA, Tokyo (JP)

(72) Inventor: Yuki Fukushima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/391,684

(22) Filed: Apr. 23, 2019

(65) Prior Publication Data

US 2019/0356845 A1 Nov. 21, 2019

(30) Foreign Application Priority Data

May 16, 2018 (JP) ................................ 2018-094759

(51) Int. Cl.
*H04N 5/232* (2006.01)
(52) U.S. Cl.
CPC ... *H04N 5/23216* (2013.01); *H04N 5/232933* (2018.08)
(58) Field of Classification Search
CPC ..................... H04N 5/23216; H04N 5/232933
See application file for complete search history.

(56) References Cited

U.S. PATENT DOCUMENTS

| 9,560,245 | B2 | 1/2017 | Fukushima | |
|---|---|---|---|---|
| 2010/0134676 | A1* | 6/2010 | Miyanishi | H04N 5/23216 348/333.01 |
| 2011/0267526 | A1* | 11/2011 | Ishihara | G03B 3/10 348/333.01 |
| 2014/0006985 | A1* | 1/2014 | Matsushima | G06F 3/04883 715/765 |
| 2015/0128087 | A1* | 5/2015 | Kang | G06F 3/04883 715/784 |
| 2016/0028938 | A1 | 1/2016 | Fukushima | |
| 2016/0085286 | A1* | 3/2016 | Zhou | G06F 1/1637 345/156 |
| 2017/0109035 | A1* | 4/2017 | Agarwal | G06F 21/604 |

FOREIGN PATENT DOCUMENTS

| JP | 2001-059984 A | 3/2001 |
|---|---|---|
| JP | 2016-024360 A | 2/2016 |

* cited by examiner

*Primary Examiner* — Hung H Lam
(74) *Attorney, Agent, or Firm* — Venable LLP

(57) ABSTRACT

An image capturing apparatus having a viewfinder, comprises a plurality of operating members to which functions are allowed to be assigned, a detecting unit configured to detect when an eye of a user is close to the viewfinder, and a control unit configured to, in a case where an operating member operated while the detecting unit detects that the eye is close is an operating member which is disposed in a prescribed location and a specific function is assigned to the operating member, forgo executing the function assigned to the operating member, and in other cases, execute the function assigned to the operating member.

8 Claims, 8 Drawing Sheets

FIG. 8

| | | | | | | |
|---|---|---|---|---|---|---|
| 📷 | AF | ▶ | 👕 | 📷 | ☆ | |
| 1 | 2 | 3 | 4 | 5 | 6 | SHOOT1 |

| | |
|---|---|
| RECORDING IMAGE QUALITY | ◰L |
| DPRAW SETTING | DO NOT |
| CONFIRMATION TIME FOR CAPTURED IMAGE | 2 SECONDS |
| ELECTRONIC SOUND | ON |
| RELEASE WITHOUT CARD | ON |
| LENS OPTICAL CORRECTION | |
| EXTERNAL FLASH CONTROL | |

FIG. 9

| SWITCH | FLAG | ASSIGNED FUNCTION |
|---|---|---|
| SW1 | 0 | #### |
| SW2 | 1 | #### |
| SW3 | 1 | LOCK/UNLOCK |
| SW4 | 0 | #### |
| ⋮ | ⋮ | ⋮ |

IMAGE CAPTURING APPARATUS FOR CONTROLLING WHETHER TO EXECUTE FUNCTION ASSIGNED TO OPERATION MEMBER, AND CONTROL METHOD THEREOF

BACKGROUND OF THE INVENTION

Field of the Invention

The present invention relates to an image capturing apparatus, and particularly relates to an image capturing apparatus including a viewfinder.

Description of the Related Art

Image capturing apparatuses, as exemplified by digital cameras, have a rich variety of functions. As such, the number of members such as switches and buttons for activating and inactivating such functions also continues to increase. How frequently each function is used sometimes depends on a user, and it has recently become normal for users to be capable of setting the types of functions assigned to the stated members.

Typically, in an image capturing apparatus provided with a viewfinder, the user can only see the subject, which is seen through the viewfinder, and a limited number of parameters, which are visible in the viewfinder. In other words, the various types of members are not visible to the user when he or she is looking through the viewfinder, that is, the user depends on his or her own intuition when attempting to operate those members provided in the image capturing apparatus includes.

Incidentally, the function assignment also includes a function for locking the various parameters set as shooting conditions and prohibiting changes to those parameters. However, there are situations where the user mistakenly presses a member to which this lock function has been assigned, while looking through the viewfinder. In such a situation, a problem arises in that the function will be locked in spite of the intentions of the user, making it impossible to carry out other operations or settings.

Aside from the lock function, the user may unintentionally press a member to which is assigned a function for carrying out some kind of display in a rear liquid crystal display of the camera, which leads to a problem in that the display will be carried out while the user is looking through the viewfinder, despite the user not wishing the display to be carried out.

Japanese Patent Laid-Open No. 2016-24360 ("Document 1" hereinafter) discloses a method for canceling the lock during a locked state only while a specific member is being pressed.

Additionally, Japanese Patent Laid-Open No. 2001-59984 ("Document 2" hereinafter) discloses a method in which only specific switches are permitted to be operated when it is detected that the user is looking through the viewfinder.

According to the method of Document 1, it is possible to temporarily cancel the lock by pressing the member in question. However, in a case where the locked state has been mistakenly activated, the user must carry out settings for assigning a function to cancel the lock, which is troublesome. The method also does not actually prevent the user from mistakenly carrying out an operation and activating the locked state while looking through the viewfinder.

According to the method of Document 2, when, during the assigning of a function, the lock function is assigned to a specific switch that is permitted to be operated, mistakenly operating that specific switch while looking through the viewfinder will result in the lock being activated, and thus the problem cannot be solved.

SUMMARY OF THE INVENTION

Having been achieved in light of the foregoing problems, the present invention provides a technique for solving problems pertaining to the misoperation of a member to which a lock function has been assigned while a user is looking through a viewfinder.

According to an aspect of the present invention, there is provided an image capturing apparatus having a viewfinder, the apparatus comprising: a plurality of operating members to which functions are allowed to be assigned; a detecting unit configured to detect when an eye of a user is close to the viewfinder; and a control unit configured to, in a case where an operating member operated while the detecting unit detects that the eye is close is an operating member which is disposed in a prescribed location and a specific function is assigned to the operating member, forgo executing the function assigned to the operating member, and in other cases, execute the function assigned to the operating member.

According to the present invention, an unintended function can be prevented from being executed in response to a misoperation while a user is looking through a viewfinder. For example, a situation where parameters are locked, a display in a rear liquid crystal display is performed, and the like due to a misoperation made while the user looking through the viewfinder can be prevented.

Further features of the present invention will become apparent from the following description of exemplary embodiments (with reference to the attached drawings).

BRIEF DESCRIPTION OF THE DRAWINGS

FIG. 8 is a diagram illustrating an example of a GUI screen display displaying a menu screen display.

FIG. 9 is a diagram illustrating an example of a table for managing function assignments according to embodiments.

DESCRIPTION OF THE EMBODIMENTS

Embodiments of the present invention will be described in detail hereinafter with reference to the appended drawings.

Note that the configurations described in the following embodiments are merely examples, and the present invention is not intended to be limited to the examples given in any way.

Figure 1:
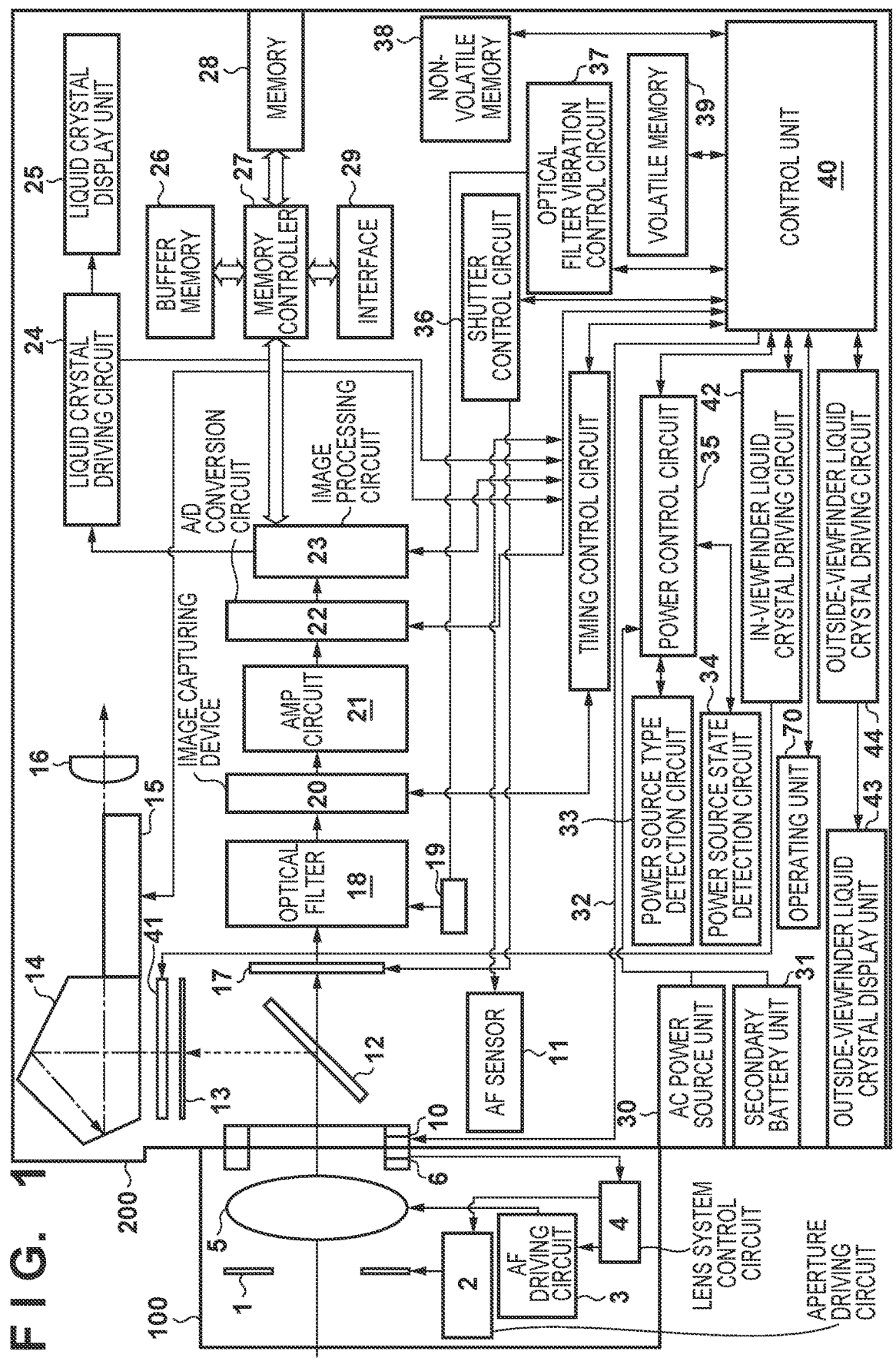
FIG. 1 is a block diagram illustrating an image capturing apparatus according to embodiments.

FIG. 1 is a block diagram illustrating an image capturing apparatus 200 according to an embodiment. Although this embodiment describes an example in which the image capturing apparatus 200 includes an optical viewfinder, the viewfinder may be an electronic viewfinder instead.

A lens unit 100 is a lens unit including an interchangeable shooting lens. A lens 5 is normally constituted by a plurality of lenses, but here only a single lens is illustrated for simplicity. A communication terminal 6 is a communication terminal for the lens unit 100 to communicate with the image capturing apparatus 200. A communication terminal 10 is a communication terminal for the image capturing apparatus 200 to communicate with the lens unit 100. A lens system control circuit 4 in the lens unit 100 communicates with a microcomputer 40 in the image capturing apparatus 200 via the communication terminals 6 and 10 to control an aperture 1 via an aperture driving circuit 2, and to carry out a process for adjusting the focus by changing the position of the lens 5 via an AF driving circuit 3. The microcomputer 40 can also obtain a maximum aperture value and a minimum aperture value of the lens unit 100 via the communication terminals 6 and 10.

An eye-is-close-detection circuit 15 detects whether an eye of the user is close to a viewfinder 16, and notifies a result of that detection to the microcomputer 40. It is sufficient for the eye-is-close-detection circuit 15 to be capable of determining whether a distance between the eye of the user and the viewfinder is a distance at which the eye is acknowledged as being "close", and thus the principles of the detection are not particularly limited. For example, an infrared rangefinding sensor can be used.

An AF sensor 11 outputs defocus amount information to the microcomputer 40. The microcomputer 40 then outputs a focusing control signal, based on the defocus amount information, to the lens unit 100.

A quick return mirror 12 is flipped up and down by an actuator (not illustrated) during exposure in response to an instruction from the microcomputer 40.

The user can confirm the focus, composition, and the like of an optical image of a subject, obtained through the lens unit 100, by observing a focusing screen 13 via a pentaprism 14 and the viewfinder 16. A focal plane shutter 17 is a focal plane shutter that can freely control an exposure time of an image capturing device 20 through control by the microcomputer 40. An optical filter 18, which is typically constituted by a low-pass filter or the like, cuts a high-frequency component of the light entering from the focal plane shutter 17, and conducts a subject image to the image capturing device 20.

The image capturing device 20 is typically an image capturing device in which a CCD, a CMOS, or the like is used, and photoelectrically converts the subject image formed on the image capturing device 20 through the lens unit 100 to obtain an electrical signal. An AMP circuit 21 amplifies the obtained electrical signal at a gain based on a set image capturing sensitivity. An A/D conversion circuit 22 converts an analog signal, obtained by the conversion carried out by the image capturing device 20, into a digital signal. An image processing circuit 23 subjects image data obtained from the digital signal conversion by the A/D conversion circuit 22 to filtering processing, color conversion processing, and gamma/knee processing, and outputs the processed image data to a memory controller 27. The image processing circuit 23 also includes a D/A conversion circuit. The image processing circuit 23 can also convert the image data obtained from the digital signal conversion by the A/D conversion circuit 22, the image data input from the memory controller 27, and the like into an analog signal, and output the analog signal to a liquid crystal display unit 25 via a liquid crystal driving circuit 24. This image processing and display processing by the image processing circuit 23 is switched by the microcomputer 40. The microcomputer 40 carries out white balance adjustment on the basis of color balance information of a captured image.

The liquid crystal display unit 25 is a rear monitor for displaying images. The display is not limited to a liquid crystal type as long as it displays images, and a different type of display, such as organic EL, may be used instead. The display may have touch detection functionality built in as well.

The memory controller 27 stores unprocessed image data input from the image processing circuit 23 in buffer memory 26, stores image data that has undergone image processing in a recording medium 28, or the like. The memory controller 27 also obtains image data from the buffer memory 26, the recording medium 28, and the like and outputs the data to the image processing circuit 23. The memory controller 27 can also store image data sent via an external interface 29 in the recording medium 28, output image data stored in the recording medium 28 to the exterior via the external interface 29, and the like. Interfaces such as USB, IEEE, HDMI (registered trademark), and the like can be given as examples of external interfaces. The recording medium 28 is a removable recording medium such as a memory card. However, the recording medium may be a built-in memory. The microcomputer 40 controls the driving timing of the image capturing device 20 via a timing control circuit 32.

A power control circuit 35 is a circuit that controls power supplied by an AC power source unit 30 or a secondary battery unit 31. The power control circuit 35 turns the power on and off in response to instructions from the microcomputer 40. The power control circuit 35 also notifies information of the present state of the power source detected by a power source state detection circuit 34, information of the type of the present power source detected by a power source type detection circuit 33, and the like to the microcomputer 40.

The microcomputer 40 controls the focal plane shutter 17 via a shutter control circuit 36.

An optical filter vibration control circuit 37 is a circuit that causes a piezoelectric device 19 connected to the optical filter 18 to vibrate. The piezoelectric device is caused to vibrate in accordance with instructions from the microcomputer 40, so that the vibration amplitude, vibration time, and axial direction of the vibration each takes on a prescribed value.

A non-volatile memory 38 is a non-volatile recording medium which is capable of saving setting values such as shutter speed, aperture value, image capturing sensitivity, and the like set by the user as desired, various types of other data, and the like even when the image capturing apparatus is turned off.

A volatile memory 39 saves data such as the internal state of the image capturing apparatus, information of the removable recording medium 28, and the like, which is only to be stored temporarily.

An in-viewfinder liquid crystal display unit 41 displays a frame indicating a rangefinding point where autofocus is currently being carried out, icons representing setting states of the camera, and the like via an in-viewfinder liquid crystal driving circuit 42. By looking through the viewfinder 16, the user can visually confirm the optical image of a subject obtained through the lens unit 100, various types of icons displayed by the in-viewfinder liquid crystal display unit 41, and the like. Although the embodiment describes an example in which an optical viewfinder is provided, in a case where an electronic viewfinder is provided, an image captured via the lens unit 100 is displayed in the in-viewfinder liquid crystal display unit 41.

An outside-viewfinder liquid crystal display unit 43 displays a variety of setting values of the camera, such as shutter speed and aperture, via an outside-viewfinder liquid crystal driving circuit 44.

An operating unit 70 includes various types of operating members as input units for accepting operations from the user. The operating unit 70 includes various types of operating members such as buttons, switches, a dial-type rotating operating member, and the like. These include a release button 201, a main electronic dial 202, a sub electronic dial 203, a power switch 204, a protect button 205, a menu button 206, a delete button 207, an enlarged mode button 208, a playback instruction button 209, a rangefinding point selection button 210, and a multi controller 211.

A control unit 40 controls the various units included in the image capturing apparatus 200, and is constituted by a microcomputer such as a CPU. The control unit 40 loads programs recorded in the non-volatile memory 38 into the volatile memory 39, which acts as work memory, and executes the programs to implement various types of processes (described later).

Figure 2A:
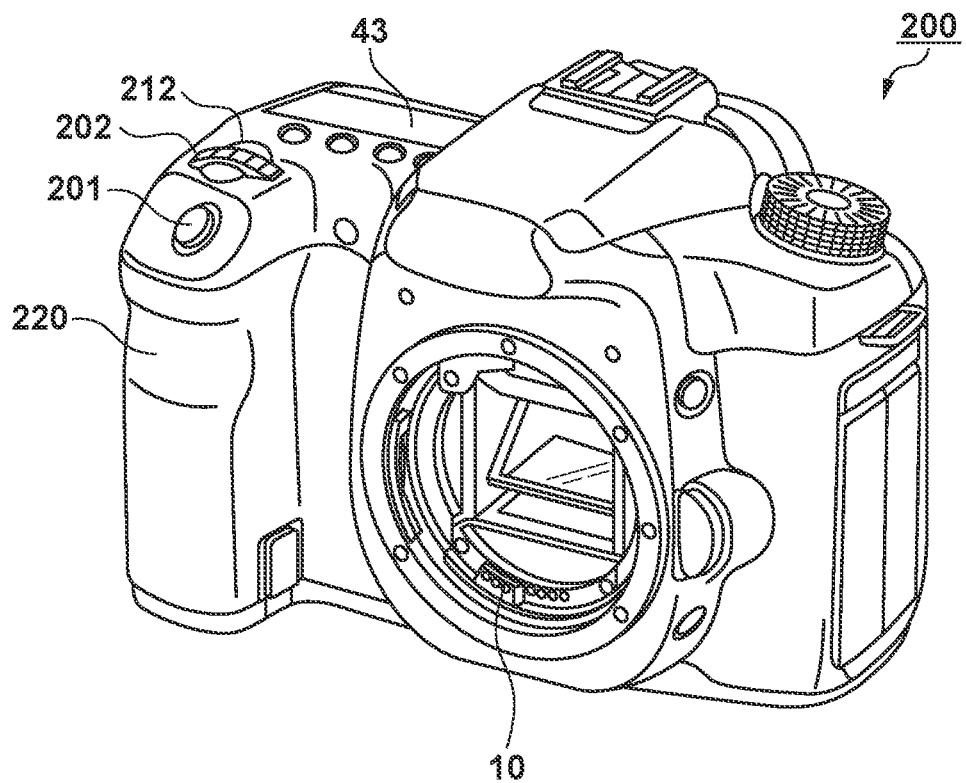
FIGS. 2A and 2B are external views of the image capturing apparatus according to embodiments.
Figure 2B:
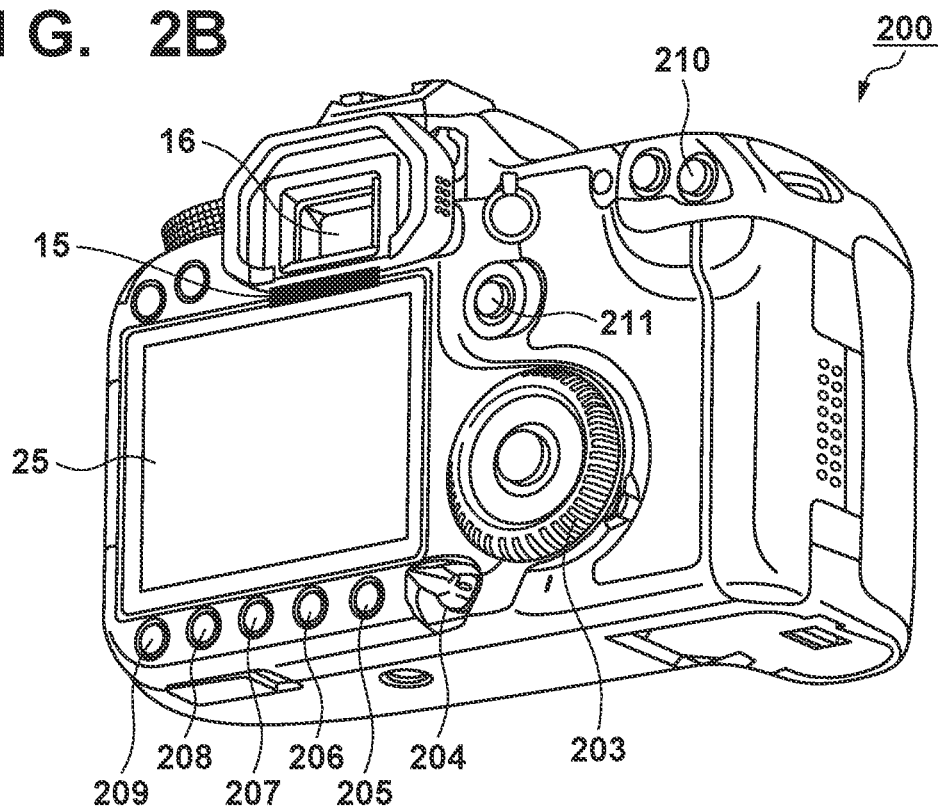
Figure 3:
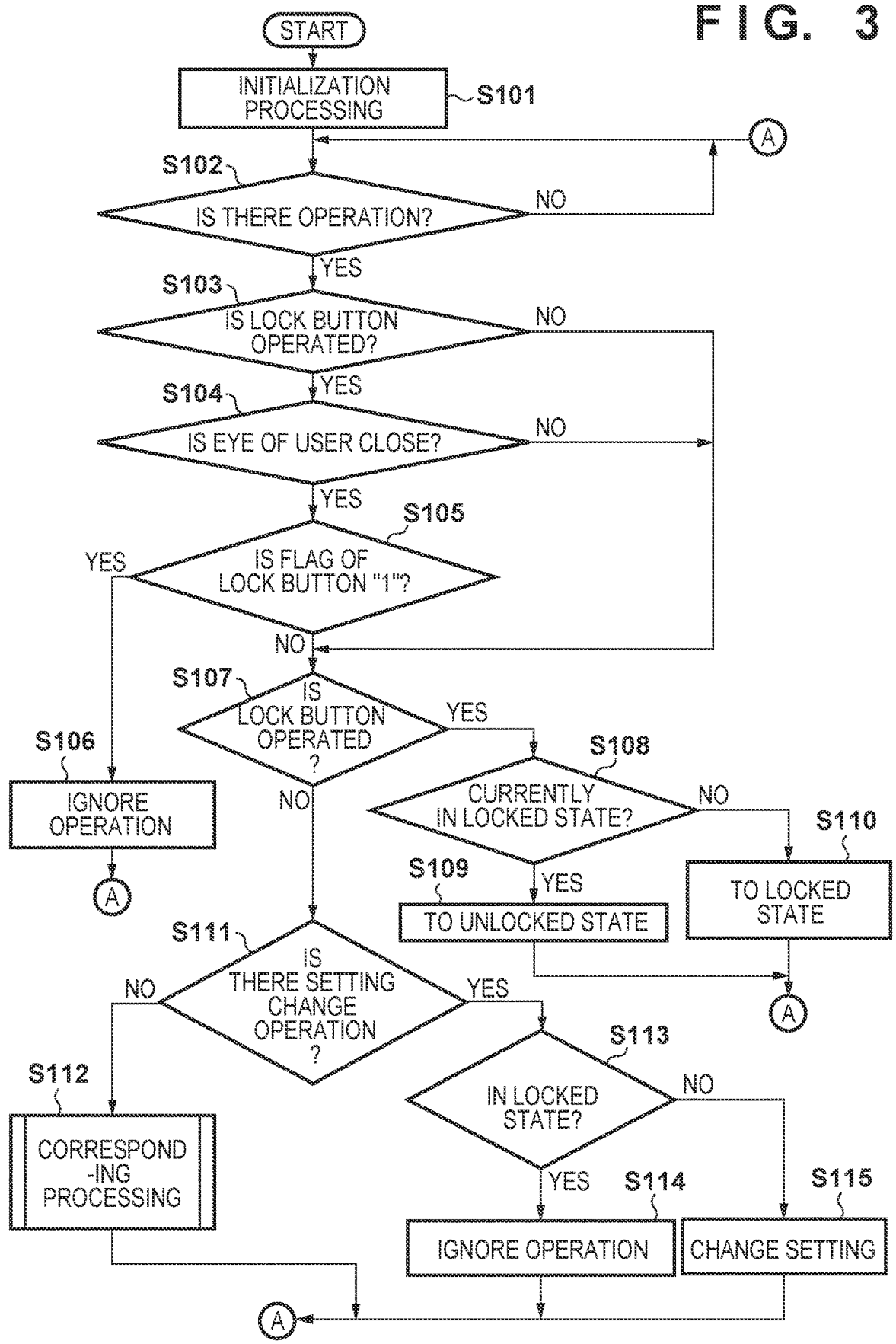
FIG. 3 is a flowchart illustrating a sequence of processing carried out when a lock button is pressed, according to a first embodiment.

FIG. 2A is a diagram illustrating the external form of the image capturing apparatus 200 as a whole from the front, and FIG. 2B is a diagram illustrating the external form of the image capturing apparatus 200 as a whole from the rear. The parts that are the same as in FIG. 1 are indicated by the same reference signs as those used in FIG. 1 and should be referenced to FIG. 1.

The release button 201 is an operating member for making a shooting preparation instruction and a shooting instruction, and by pressing the button halfway, the brightness of the subject is measured, focusing is carried out, and the like. Fully pressing the button releases the shutter, and an image is shot and recorded as a result.

The main electronic dial 202 is a rotating operating member, and by rotating the main electronic dial 202, the user can change setting values such as the shutter speed and aperture value, make fine adjustments to the enlargement magnification while in the enlarged mode, and the like. The sub electronic dial 203 is a rotating operating member, and by rotating the sub electronic dial 203, the user can change setting values such as the aperture value and exposure correction, move to the next image when in an image display mode, and the like. The power switch 204 is an operating member for turning the power on and off.

The protect button 205 is an operating member for carrying out processing such as protecting and rating an image saved in a recording medium inside or outside of the image capturing apparatus. The menu button 206 is an operating member for displaying various setting screens in the liquid crystal display unit 25. The delete button 207 is an operating member for instructing an image saved in a recording medium inside or outside of the image capturing apparatus to be deleted. The enlarged mode button 208 is an operating member for accepting an operation instructing a transition to the enlarged mode (an enlarged mode start instruction) when in a playback mode, and an instruction to exit the enlarged mode (an enlarged mode end instruction). The button can also be used as a button for activating functions aside from the enlargement function by making a setting in a function assignment screen. The playback instruction button 209 is an operating member for displaying, in the liquid crystal display unit 25, an image saved in a recording medium inside or outside the image capturing apparatus.

A rangefinding point selection button 210 is an operating member for entering a mode to select a rangefinding point, which is a point where autofocus is started. The button can also be used as a button for activating functions aside from the rangefinding point selection function by making a setting in the function assignment screen.

The multi controller 211 is an operating member that can be operated in multiple directions to set a rangefinding point, which is a point where autofocus is started, to move an enlargement frame (enlarged range) in an enlarged image display mode, and the like. A lock button 212 is a repetitive operating member that toggles between locking and unlocking parameters changes each time the button is pressed.

The foregoing has been a description of the configuration of the image capturing apparatus 200. Embodiments based on the above-described configuration will be described in detail next.

First Embodiment

Processing carried out when the lock button is pressed according to a first embodiment of the present invention will be described next with reference to FIGS. 3, 5A, 5B, 6A, and 6B.

Although the lock button 212 is set as the switch that locks and unlocks when the apparatus is shipped from the manufacturer, it should be noted that there may be situations where the user assigns locking and unlocking to another desired switch.

Figure 5A:
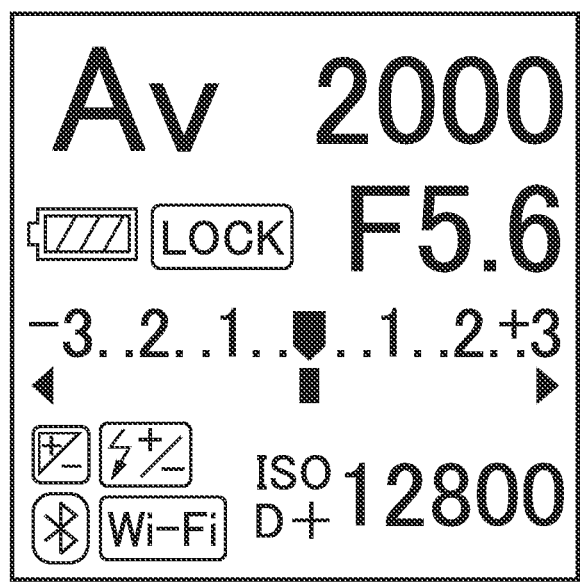
FIG. 5A is a diagram illustrating an example of a display carried out in a top liquid crystal display when in a locked state, and FIG. 5B, when in an unlocked state.
Figure 5B:
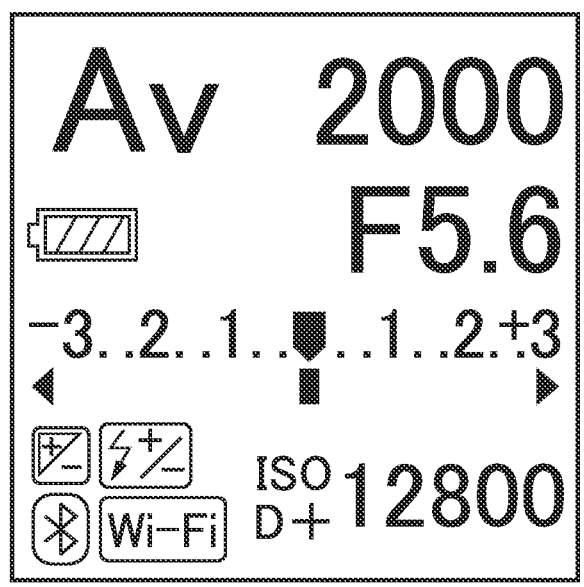

FIGS. 5A and 5B illustrate examples of displays in the outside-viewfinder liquid crystal display unit 43 (see FIG. 2A). In FIG. 5A, "LOCK" is displayed, indicating a locked state. However, "LOCK" is not displayed in FIG. 5B, indicating an unlocked state. Although these screens switch each time the lock button is pressed, the unlocked state is in effect immediately after the power of the image capturing apparatus 200 is turned on.

Figure 6A:
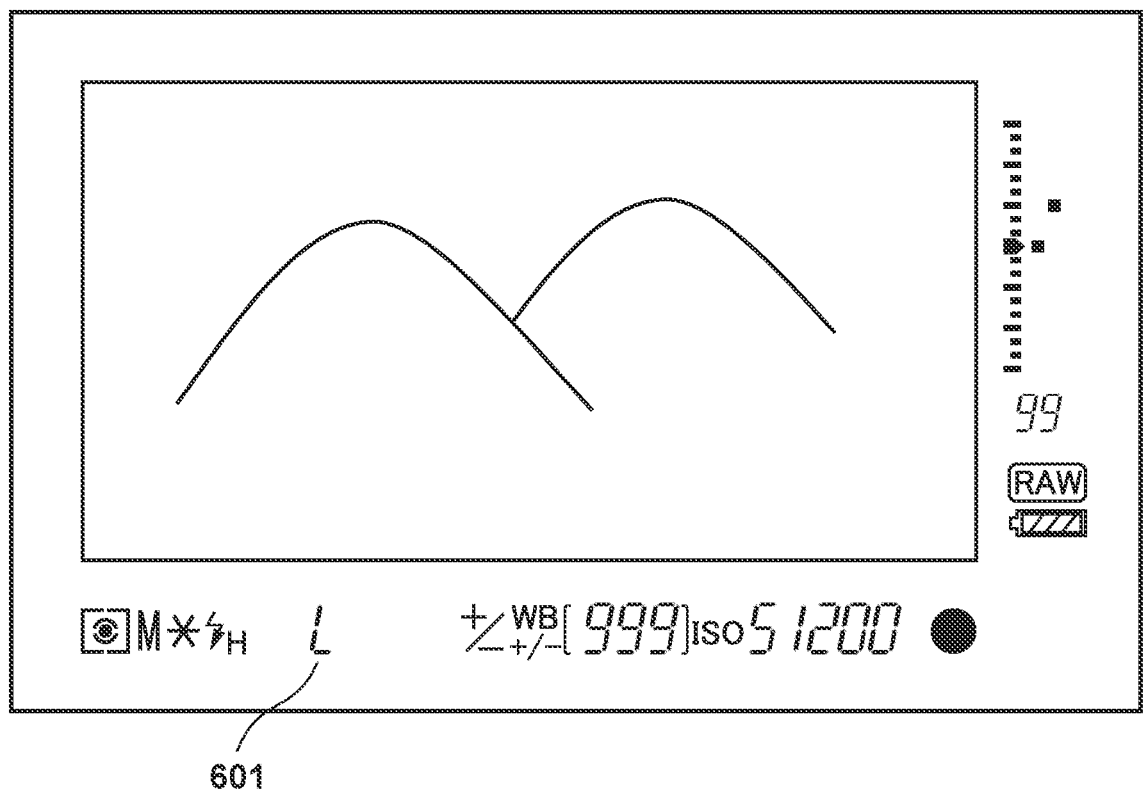
FIG. 6A is a diagram illustrating an example of a display carried out in a viewfinder when in the locked state, and FIG. 6B, when in the unlocked state.
Figure 6B:
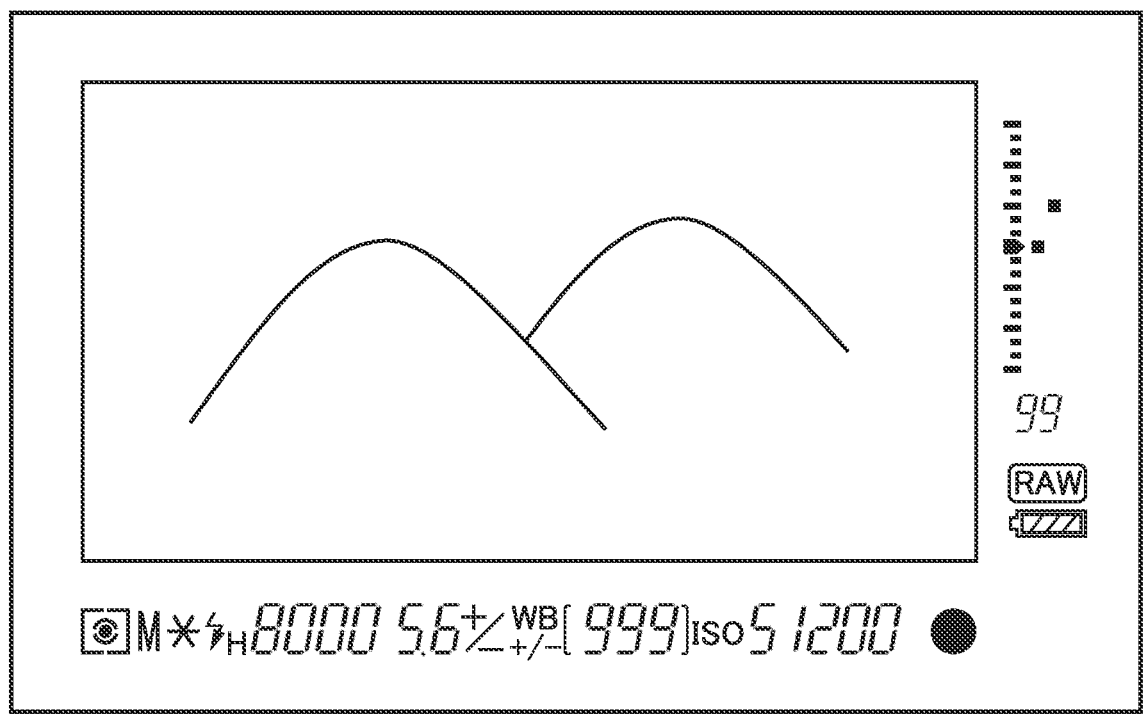

FIGS. 6A and 6B each illustrate examples of displays in the viewfinder 16. FIG. 6A indicates the locked state with an "L" displayed at the bottom of the screen (601 in FIG. 6A), whereas FIG. 6B indicates the unlocked state by hiding the "L".

The functions of the power switch 204, the release button 201, and the like are fixed, and thus functions cannot be assigned to those members. The various switches to which functions can be assigned are managed in a table, as illustrated in FIG. 9. This table is stored and held in the non-volatile memory 38, and the first and second fields of the table are fixed. The information specifying the functions assigned by the user is stored in the third field. The functions can also be restored to the states assigned when the apparatus was shipped from the factory in response to a request from the user.

The first field holds information specifying the switches as hardware. Here, it should be noted that "switch" is a concept including push-type buttons.

The second field holds flags indicating whether the corresponding switch is a switch that is susceptible to misoperation or tending not to have misoperation while the user is looking through the viewfinder 16. When the user is looking through the viewfinder, he or she cannot see the switches provided in the image capturing apparatus 200. As such, the user must operate those switches based on his or her intuition or how the switches feel. Here, it is assumed that switches located near the position of the release button 201, which is pressed by the index finger on the right hand while the user holds a grip 220 of the image capturing apparatus 200, are switches that are susceptible to misoperation while the user looks through the viewfinder 16. Additionally, it is assumed that switches located near the position of the thumb on the right hand while the user holds the grip 220 of the image capturing apparatus 200, are switches that are susceptible to misoperation while the user looks through the viewfinder 16. The flag is set to 1 for the switches susceptible to misoperation. As illustrated in FIG. 9, there are multiple switches for which the flag is set to 1. On the other hand, the flag is set to 0 for the switches that are not likely to be mistakenly operated. In this embodiment, a lock/unlock function is assigned to the lock button 212 by default, and is managed as the switch corresponding to "SW3" in FIG. 9. Being located near the release button 201, the lock button 212 is a switch susceptible to misoperation, and the flag is therefore set to 1. It should be noted that the lock/unlock function can also be assigned to a switch aside from the switch SW3. As such, reference sign 212 will not be added to the lock button in the following descriptions.

Although this embodiment describes managing the functions assigned to switches and the flags for classifying the switches that are susceptible to misoperation/tending not to have misoperation using a single table, these items may instead be managed using separate tables.

When the power switch 204 of the image capturing apparatus 200 is turned on, in step S101, the control unit 40 initializes various items in order to function as an image capturing apparatus. The initialization processing includes processing for loading the table stored in the non-volatile memory 38 into the volatile memory 39. As described earlier, it is assumed that the image capturing apparatus 200 is in the unlocked state at this initialization stage. The information indicating the locked state or the unlocked state is held in the volatile memory 39. Note that the following processing is executed while the power switch 204 of the image capturing apparatus 200 is in an on state, and ends when the power switch 204 is off. Then, in step S102, the control unit 40 stands by for an instruction from the user made through the operating unit 70.

Upon an instruction being input by the user, the control unit 40 moves the processing to step S103, where it is determined whether the lock button has been operated. It should be noted that the lock button may be the switch SW3 to which the lock/unlock function is assigned by default, or the user may have changed the assignment so that the lock button is assigned to a switch aside from the switch SW3. In accordance with a determination that the lock button has been operated, the control unit 40 moves the processing to step S104. However, in accordance with a determination that a switch aside from the lock button has been operated, the control unit 40 moves the processing to step S107.

In step S104, the control unit 40 determines whether the eye of the user is close to the viewfinder 16, i.e., whether the user is looking through the viewfinder 16, on the basis of eye-is-close information input from the eye-is-close-detection circuit 15. The control unit 40 moves the processing to step S105 in accordance with a determination that the eye of the user is close, and moves the processing to step S107 in accordance with a determination that the eye of the user is not close.

Described in terms of the conditions mentioned above, the processing moving to step S105 corresponds to a case where the switch to which the lock function is assigned to, has been operated while the eye-is-close-detection circuit 15 detects that the eye of the user is close to the viewfinder 16. As such, the control unit 40 determines whether the flag is 1 for the operated switch (see FIG. 9) in step S105. To summarize, the control unit 40 determines whether the user has, while looking through the viewfinder 16, operated "an operating member which is located near a position where a finger on the right hand of the user (index finger or thumb) makes contact while the user holds the grip 220 of the image capturing apparatus 200, and which is susceptible to misoperation" as the lock button.

In accordance with a determination in step S105 that the operated lock button is a switch susceptible to misoperation, the control unit 40 moves the processing to step S106. In step S106, the control unit 40 determines that the operation of the lock button is to be ignored (inactivated), and returns the processing to step S102 without carrying out the process of switching between the locked state and the unlocked state.

In the other hand, when the processing has moved to step S107, the control unit 40 determines whether the switch that has been operated is the lock button. The control unit 40 moves the processing to step S108 when it is determined that the lock button has been operated, and moves the processing to step S111 when such is not the case (when a switch aside from the lock button has been operated). Note that the processing of step S107 is the same as the processing of S103, and can therefore be omitted. In a case where step S107 is omitted, the control unit 40 moves the processing to step S111 in accordance with a determination in step S103 that a switch aside from the lock button has been operated.

The processing moving to step S108 corresponds to either a case where the user has operated the lock button when not looking through the viewfinder 16, or a case where the user has operated the lock button assigned to a switch in a position tending not to have misoperation while looking through the viewfinder 16. As such, the control unit 40 determines whether the image capturing apparatus 200 is currently in the locked state. In accordance with a determination that the image capturing apparatus 200 is in the locked state, the control unit 40 moves the processing to step S109 and transitions the image capturing apparatus 200 to the unlocked state. On the other hand, when the current state is the unlocked state, the control unit 40 moves the processing to step S110 and transitions the image capturing apparatus 200 to the locked state. A region in the volatile memory, which stores the state, is updated by this transition processing. The control unit 40 then returns the processing to step S102.

In step S111, the control unit 40 determines whether the switch that has been operated is a switch involved in changing a setting. Specifically, it is determined whether the main electronic dial 202, the sub electronic dial 203, or the like has been operated to change a setting pertaining to image capturing (shutter speed, aperture value, ISO sensitivity, and the like). In accordance with a determination that a switch involved in changing a setting has been operated, the control unit 40 moves the processing to step S113. However, in accordance with a determination that a switch aside from one involved in changing a setting has been operated, the control unit 40 moves to step S112.

In step S112, the control unit 40 carries out processing in accordance with the switch that has been operated. For example, when the operation is one in which the fully-pressed switch of the release button 201 is on, the control unit 40 executes an image capturing and recording process.

In step S113, the control unit 40 determines whether the image capturing apparatus 200 is currently in the locked state. The control unit 40 moves the processing to step S114 when the image capturing apparatus 200 is in the locked state, and moves the processing to step S115 when the image capturing apparatus 200 is in the unlocked state.

In step S114, the control unit 40 determines that the instruction to change the setting is to be ignored (inactivated), and returns the processing to step S102 without executing processing for reflecting the change made to the settings by the user. On the other hand, in step S115, the control unit 40 executes processing for reflecting the change made to the settings by the user, after which the control unit 40 returns the processing to step S102.

According to the present embodiment as described thus far, when the user has operated the lock button while looking through the viewfinder, and the lock button is a switch located in a position where a finger (the index finger or thumb) of the right hand of the user makes contact while the user holds the grip 220 of the image capturing apparatus 200 and is thus susceptible to misoperation, that operation is ignored, and the lock/unlock function is inactivated. Accordingly, a situation where the state is transitioned to the locked state in spite of the intentions of the user can be prevented from occurring.

Second Embodiment

The configuration of the apparatus described below in a Second Embodiment is assumed to be the same as in the First Embodiment. The present Second Embodiment describes an example applied to the misoperation of a menu button.

A case where a switch, to which a function for carrying out a menu display is assigned, is operated, according to the second embodiment of the present invention, will be described with reference to FIGS. 4, 8, 7A, and 7B.

The display switches between on and off each time the menu button is pressed, and while in an on state, the control unit 40 displays a menu, such as that illustrated in FIG. 8, in the display unit 25.

A menu display on/off function is assigned to the menu button 206 by default. The switch to which the menu display on/off function is assigned can be changed in response to the operations by the user.

Figure 7A:
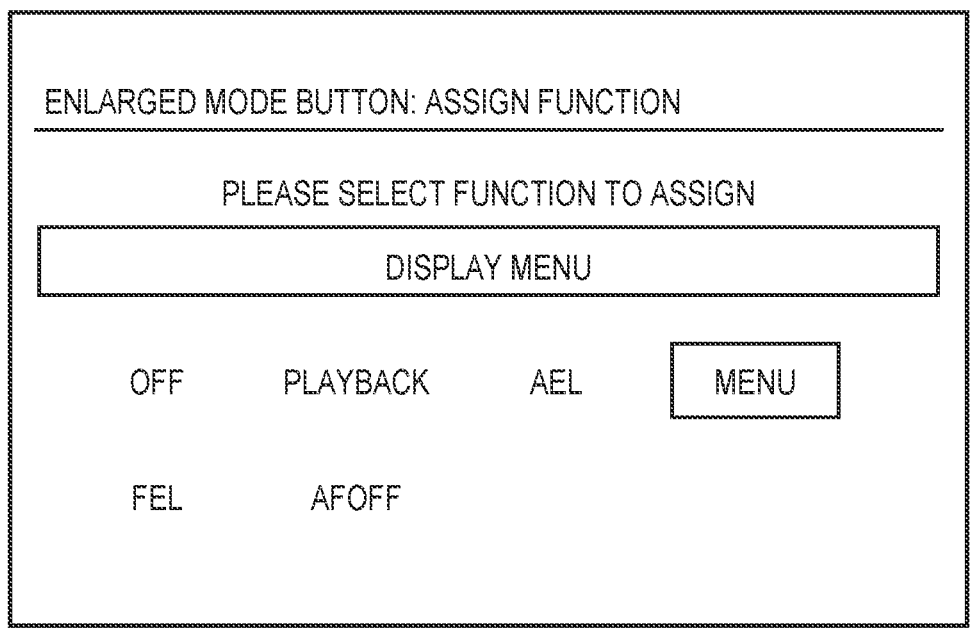
FIG. 7A is a diagram illustrating an example of a GUI screen display for assigning the function of an enlarged mode button.
Figure 7B:
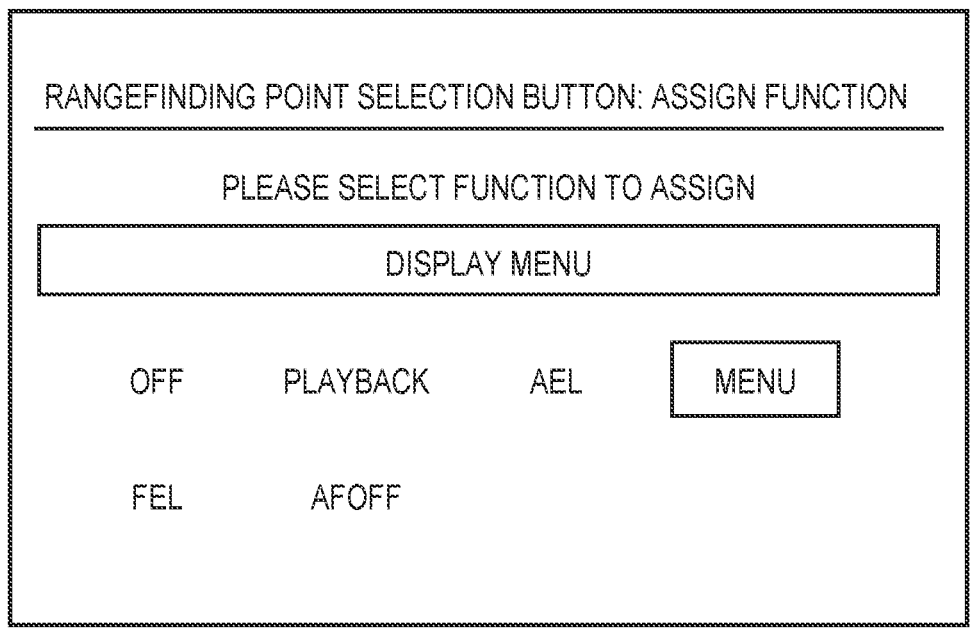
FIG. 7B is a diagram illustrating an example of a GUI screen display for assigning the function of a rangefinding point selection button.

FIGS. 7A and 7B illustrate examples of displays made in the liquid crystal display unit 25. FIG. 7A illustrates an example of a screen displayed when the user assigns a "menu display" function to the enlarged mode button 208, to which the enlarged mode is assigned by default. FIG. 7B illustrates an example of a screen displayed when the user assigns the "menu display" function to the rangefinding point selection button 210, to which the rangefinding point selection function is assigned by default.

Figure 4:
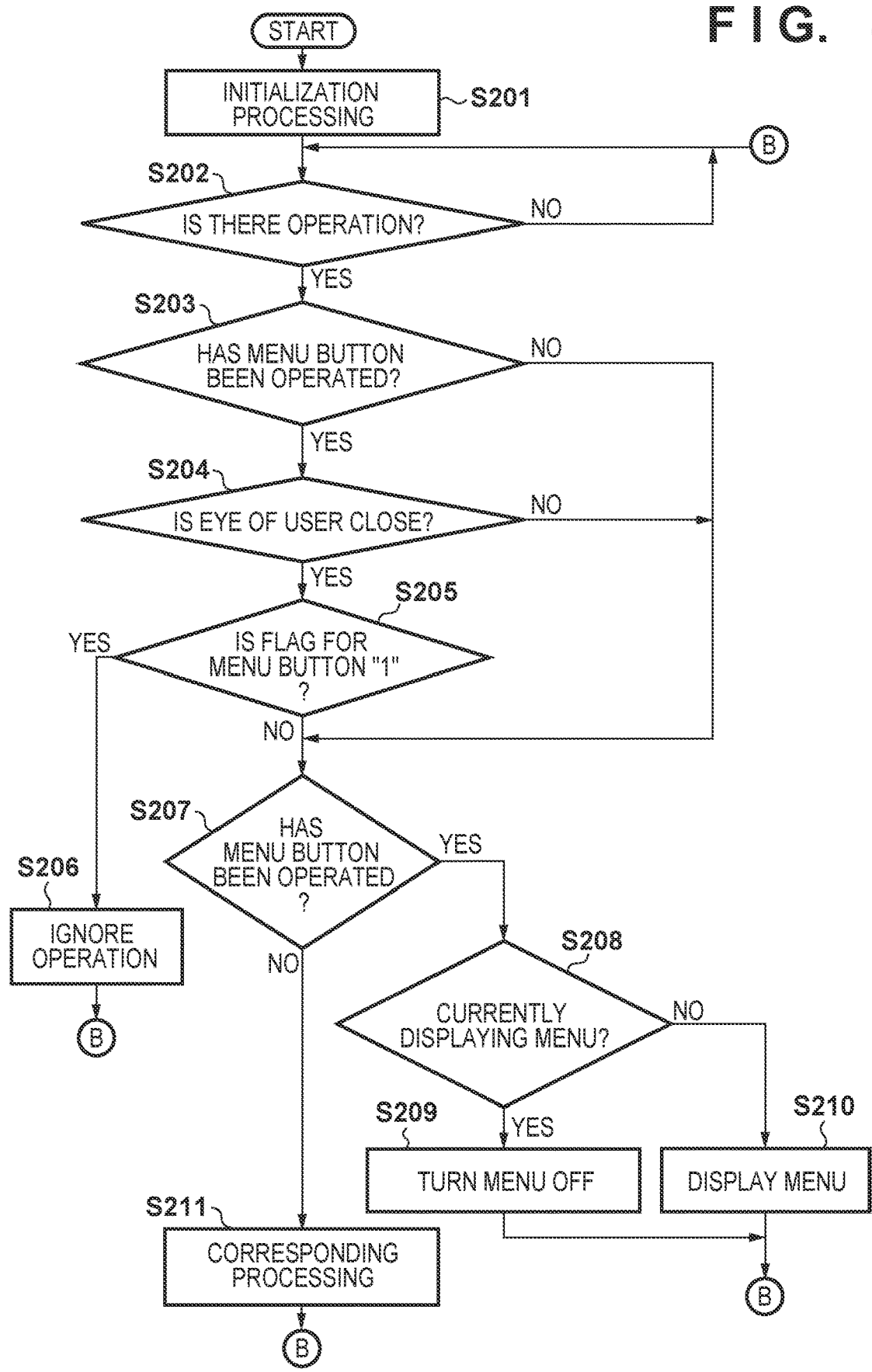
FIG. 4 is a flowchart illustrating a sequence of processing carried out when a button, to which is assigned a function for carrying out a display in a rear liquid crystal display, is pressed.

The processing by the control unit 40 according to the present Second Embodiment will be described hereinafter with reference to the flowchart in FIG. 4.

When the power switch 204 of the image capturing apparatus 200 is turned on, in step S201, the control unit 40 initializes various items in order to function as an image capturing apparatus. The initialization processing includes processing for loading the table stored in the non-volatile memory 38 into the volatile memory 39. Furthermore, at the initialization stage, information indicating whether the menu display is in an on state or an off state is held in the volatile memory 39. In the initialization stage, the menu display is in an off state. Note that the following processing is executed while the power switch 204 of the image capturing apparatus 200 is in an on state, and ends when the power switch 204 is off.

Next, in step S202, the control unit 40 stands by for an instruction from the user made through the operating unit 70.

Upon an instruction being input by the user, the control unit 40 moves the processing to step S203, where it is determined whether the menu button has been operated. It should be noted that although the menu button is assigned to the menu button 206 when the apparatus was shipped from the factory, the user may have assigned the menu button to another switch. When it is determined that the menu button has been operated, the control unit 40 moves the processing to step S204. However, when it is determined that a switch aside from the menu button has been operated, the control unit 40 moves the processing to step S207.

In step S204, the control unit 40 determines whether the eye of the user is close to the viewfinder 16, i.e., whether the user is looking through the viewfinder 16, on the basis of the eye-is-close information input from the eye-is-close-detection circuit 15. The control unit 40 moves the processing to step S205 when it is determined that the eye of the user is close, and moves the processing to step S207 when it is determined that the eye of the user is not close.

Described in terms of the conditions mentioned above, the processing moving to step S205 corresponds to a case where the user has operated the menu button while looking through the viewfinder 16. As such, the control unit 40 determines whether the flag is 1 for the operated menu button (see FIG. 9) in step S205. To summarize, the control unit 40 determines whether the user has, while looking through the viewfinder 16, operated "an operating member which is located near a position where a finger on the right hand of the user (index finger or thumb) makes contact while the user holds the grip 220 of the image capturing apparatus 200, and which is susceptible to misoperation" as the menu button.

In accordance with a determination in step S205 that the operated menu button is a switch susceptible to misoperation, the control unit 40 moves the processing to step S206. In step S206, the control unit 40 determines that the operation of the menu button is to be ignored (inactivated), and returns the processing to step S202 without carrying out the process of switching between displaying and hiding the menu. For example, when the menu display is in an off state, the menu display will not be made in the liquid crystal display unit 25 on the rear surface of the image capturing apparatus 200 while the user is looking through the viewfinder 16, even when the user has pressed a menu button assigned to a location susceptible to misoperation. Thus even in a case where the liquid crystal display unit 25 has a touch panel, misoperations made at a touched position can be prevented. Furthermore, a backlight or the like can be suppressed from lighting up, which makes it possible to keep power consumption low.

On the other hand, when the processing has moved to step S207, the control unit 40 determines whether the switch that has been operated is the menu button. The control unit 40 moves the processing to step S208 when it is determined that the menu button has been operated, and moves the processing to step S211 when such is not the case (when a switch aside from the menu button has been operated). Note that the processing of step S207 is the same as the processing of S203, and can therefore be omitted. In a case where step S207 is omitted, the control unit 40 moves the processing to step S211 when it is determined in step S203 that a switch aside from the menu button has been operated.

The processing moving to step S208 corresponds to either a case where the user has operated the menu button when not looking through the viewfinder 16, or a case where the user has operated the menu button assigned to a switch in a position tending not to have misoperation while looking through the viewfinder 16. As such, the control unit 40 determines whether the image capturing apparatus 200 is currently displaying the menu. When it is determined that the menu is currently being displayed, the control unit 40 moves the processing to step S209, where the menu display is turned off. When, however, the menu is currently not being displayed, the control unit 40 moves the processing to step S210, and displays the menu screen (see FIG. 8) in the liquid crystal display unit 25 on the rear surface. A region in the volatile memory, which stores the state pertaining to the menu display, is updated by this transition processing. The control unit 40 then returns the processing to step S202.

In step S211, the control unit 40 carries out processing in accordance with the switch that has been operated. For example, in a case where the operation is one in which the fully-pressed switch of the release button 201 is on, the control unit 40 executes an image capturing and recording process.

According to the present Second Embodiment as described thus far, when the user has operated the menu button while looking through the viewfinder 16, and the menu button is a switch located in a position where a finger (the index finger or thumb) of the right hand of the user makes contact while the user holds the grip 220 of the image capturing apparatus 200 and is thus susceptible to misoperation, that operation is ignored, and the function for turning the menu display on and off is inactivated. Accordingly, a situation where the menu display is switched in spite of the intentions of the user can be prevented from occurring.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-094759, filed May 16, 2018, which is hereby incorporated by reference herein in its entirety.

What is claimed is:

1. An image capturing apparatus having a viewfinder, the apparatus comprising:
a plurality of operating members to which functions are allowed to be assigned;
a detecting unit configured to detect when an eye of a user is close to the viewfinder; and
a control unit configured to, in a case where (a) an operating member operated while the detecting unit detects that the eye is close is an operating member which is disposed in a prescribed location and (b) a first function is assigned to the operating member, not to execute the first function,
wherein the first function is (a) to change a state to a lock state in which parameters set as shooting conditions cannot be changed, or (b) to switch a display state between displaying and hiding a menu on a display unit disposed outside of the viewfinder,
wherein the operating member is a member different from the display unit and is a member disposed at a position where a finger on a hand of the user that holds a grip provided in the apparatus can reach, and
wherein, in a case where (a) an operating member operated while the detecting unit detects that the eye is close is an operating member which is disposed in the prescribed location and (b) a function assigned to the operating member is a second function different from the first function, the control unit executes the second function.

2. The apparatus according to claim 1, wherein the finger is the index finger or the thumb.

3. The apparatus according to claim 1, further comprising:
a management unit configured to classify and manage each of the plurality of operating members as either an operating member susceptible to misoperation or an operating member tending not to have misoperation while the eye is close to the viewfinder, in accordance with the position where the operating member is disposed,
wherein the operating member disposed in the prescribed location is classified as being susceptible to misoperation.

4. The apparatus according to claim 3, wherein the management unit manages the plurality of operating members in a table having flags, the flags being used to classify, among the plurality of operation members, an operating member located near a release button to which a function is not allowed to be assigned, and an operating member near a position that makes contact with a thumb of the user when the user holds the image capturing apparatus, as operating members susceptible to misoperation, and other operating members as operating members tending not to have misoperation.

5. The apparatus according to claim 1, wherein, in a case where, while the detecting unit detects that the eye is not close, an operating member which is disposed in the prescribed location and to which the first function is assigned is operated, the control unit executes the first function.

6. The apparatus according to claim 1, wherein the first function includes a function for changing the lock state into an unlock state in which parameters set as shooting conditions can be changed.

7. A method of controlling an image capturing apparatus, wherein the image capturing apparatus includes (a) a viewfinder, (b) a plurality of operating members allowing functions to be assigned, and (c) a detecting unit configured to detect when an eye of a user is close to the viewfinder, the method comprising:

in a case where (a) an operating member operated while the detecting unit detects that the eye is close is an operating member which is disposed in a prescribed location and (b) a first function is assigned to the operating member, not executing the first function, wherein the first function is (a) to change a state to a lock state in which parameters set as shooting conditions cannot be changed, or (b) to switch a display state between displaying and hiding a menu on a display unit disposed outside of the viewfinder, and wherein the operating member is a member different from the display unit and is a member disposed in a position where a finger on a hand of the user that holds a grip provided in the image capturing apparatus can reach; and in a case where (a) an operating member operated while the detecting unit detects that the eye is close is an operating member which is disposed in the prescribed location and (b) a function assigned to the operating member is a second function different from the first function, executing the second function.

8. A non-transitory computer-readable storage medium storing a program to be executed by a computer in an image capturing apparatus which comprises (a) a viewfinder, (b) a plurality of operating members to which functions are allowed to be assigned, and (c) a detecting unit configured to detect when an of a user is close to the viewfinder, the program causing the computer to:

in a case where (a) an operating member operated while the detecting unit detects that the eye is close is an operating member which is disposed in a prescribed location and (b) a first function is assigned to the operating member, not execute the first function, wherein the first function is (a) to change a state to a lock state in which parameters set as shooting conditions cannot be changed, or (b) to switch a display state between displaying and hiding a menu on a display unit disposed outside of the viewfinder, and wherein the operating member is a member different from the display unit and is a member disposed in a position where a finger on a hand of the user that holds a grip provided in the image capturing apparatus can reach; and in a case where (a) an operating member operated while the detecting unit detects that the eye is close is an operating member which is disposed in the prescribed location and (b) a function assigned to the operating member is a second function different from the first function, execute the second function.

* * * * *